Patented June 25, 1929.

1,718,616

UNITED STATES PATENT OFFICE.

ANTON EDUARD VAN ARKEL AND JAN HENDRIK DE BOER, OF EINDHOVEN, NETHERLANDS, ASSIGNORS TO N. D. PHILIPS' GLOEILAMPENFABRIEKEN, OF EINDHOVEN.

PROCESS FOR DISSOLVING A MIXTURE OF HAFNIUM AND ZIRCONIUM SALTS AND FOR SEPARATING HAFNIUM AND ZIRCONIUM.

No Drawing. Application filed May 11, 1925, Serial No. 29,561, and in the Netherlands June 6, 1924.

This invention relates to a process of dissolving certain hafnium and zirconium phosphates and of separating hafnium and zirconium in the solution thus obtained.

According to the invention, the process may consist in dissolving a mixture of phosphates of hafnium and zirconium in a medium containing free oxalic acid, whereby the said phosphates are converted into complex hafnium and zirconium compounds. This medium may consist, for example, of a solution of oxalic acid, or of a solution of oxalates with so much acid that oxalic acid is liberated.

According to the invention, hafnium and zirconium oxide can be precipitated out of the obtained solution of the said hafnium and zirconium salts with the aid of a base or an alkaline reacting substance of sufficiently high concentration of hydroxylions.

According to the invention, a mixture of hafnium and zirconium compounds is separated by starting from the solution of said hafnium and zirconium salts in a medium containing free oxalic acid. This solution can be separated in many known ways. According to the invention very favorable results are obtained by fractional precipitation of the solution, preferably with the aid of hydrochloric acid.

The invention will be more clearly understood with reference to some examples.

If 1 litre of a suspension of a mixture of hafnium and zirconium phosphate, containing about 25 grammes of metal, is introduced into a saturated oxalic acid solution, it appears that 1½ litres of this solution are needed for dissolving the phosphate suspension.

If the solution thus obtained is poured out into such a quantity of an alkaline reacting substance that the liquid shows an alkaline reaction until the end, a deposit of a mixture of hafnium and zirconium oxide is obtained.

If a quantity of a mixture of hafnium and zirconium phosphate, containing about 4% of hafnium relative to zirconium, is dissolved in 24 litres of oxalic acid, this solution can be partly precipitated with the aid of 2½ litres of concentrated hydrochloric acid. The deposit obtained is sucked away and dissolved once more in 5½ litres of oxalic acid, and is then again precipitated with 2 litres of hydrochloric acid. This deposit is once more dissolved in 6 litres of oxalic acid and precipitated with the aid of 2 litres of hydrochloric acid. The deposit thus obtained is found to contain 30% of hafnium relative to zirconium. After twice carrying out the process described, the deposit contains 50% of hafnium relative to zirconium, and by repeatedly carrying out the process, a deposit can be obtained which contains a very high content of hafnium.

Instead of precipitating with the aid of hydrochloric acid, other precipitating agents, for example alcohol, may be used. In many cases the solution can be precipitated by heating it.

What we claim is:

1. A process of bringing into solution a mixture of hafnium and zirconium phosphates, characterized in that said hafnium and zirconium salts are introduced into a medium containing free oxalic acid.

2. A process for converting a mixture of hafnium and zirconium phosphates, characterized in that said hafnium and zirconium salts are introduced into a medium containing free oxalic acid, and that from said solution hafnium and zirconium oxide are precipitated by means of an alkaline reacting substance having a sufficiently high concentration of hydroxylions.

3. A process of converting a mixture of hafnium and zirconium phosphates, characterized in that said hafnium and zirconium salts are introduced into a medium containing free oxalic acid, and that from said solution hafnium and zirconium oxide are precipitated by means of a base.

4. A process of separating hafnium and zirconium compounds, characterized in that the process is started from a solution that can be obtained by bringing a mixture of hafnium and zirconium phosphates in a medium that contains free oxalic acid and submitting said solution to fractional separation.

5. A process of separating hafnium and zirconium compounds, characterized in that the process is started from a solution that can be obtained by bringing a mixture of hafnium and zirconium phosphates in a medium that contains free oxalic acid and submitting said solution to fractional precipitation.

In testimony whereof we affix our signatures, at the city of Eindhoven this 18th day of April, A. D. 1925.

ANTON EDUARD VAN ARKEL.
JAN HENDRIK DE BOER.